United States Patent [19]

Eberhardt et al.

[11] 4,453,038
[45] Jun. 5, 1984

[54] CIRCUIT ARRANGEMENT FOR PRODUCING CONTROL MEANS FROM LINE CURRENT

[75] Inventors: Kurt Eberhardt; Dietrich Höppner; Bernhard Rall, all of Ulm, Fed. Rep. of Germany

[73] Assignee: Licentia Patent-Verwaltungs GmbH, Fed. Rep. of Germany

[21] Appl. No.: 370,401

[22] Filed: Apr. 21, 1982

[30] Foreign Application Priority Data

Apr. 24, 1981 [DE] Fed. Rep. of Germany ....... 3116262

[51] Int. Cl.$^3$ ............................................. H04M 1/00
[52] U.S. Cl. ................................ 179/81 B; 179/16 F
[58] Field of Search ................... 179/16 F, 81 B, 81 R

[56] References Cited

U.S. PATENT DOCUMENTS 3,781,481 12/1973 Shaffer et al. ...................... 179/16 F Primary Examiner—Harold I. Pitts
Assistant Examiner—James L. Dwyer
Attorney, Agent, or Firm—McGlew and Tuttle

[57] ABSTRACT

To control the earphone and microphone amplifiers as well as the balancing network of a subscriber's telephone terminal which is fed, through a subscriber line in communication systems, to the effect that the attenuations in subscriber lines of unequal lengths do not affect the transmission characteristics between the exchange and the subscriber, a circuit arrangement is provided for producing the necessary control function, which is simple, integratable and has minimum tolerances. Above a predetermined threshold value, a voltage proportional to the line current variations controls the emitter-to-base junction of two grounded-base transistors at the collectors of which the control current is available. The control currents produce their effect on the negative feedback of the microphone and the earphone amplifiers. An increasing line current causes the cotrol current to decrease, thereby effecting a stronger feedback and a reduced amplification. Further, the voltage proportional to the line current variations and available at the emitter resistor of another transistor, controls the balancing impedance through a current mirror, to attenuate the sidetone independently of the length of the subscriber line.

5 Claims, 7 Drawing Figures

CIRCUIT ARRANGEMENT FOR PRODUCING CONTROL MEANS FROM LINE CURRENT

FIELD AND BACKGROUND OF THE INVENTION

The present invention relates in general to communication line signal control and, in particular, to a new and useful circuit arrangement for controlling signals to reduce attenuation.

In electrical communications, subscribers' terminals, for example, telephone sets, are connected to subscriber lines which vary in length depending on the remoteness of the telephone exchange. This results in unequal subscriber line losses or unequal input impedances of the line, whereby a stronger attenuation of the sidetone signals in the hybrid circuit incorporated in the subscribers' terminal is made more difficult.

With the feed circuit known, the length of the line can be determined from the DC current in the line. Then, the gain of amplifier circuits in the subscriber's terminal may be controlled to obtain a line-terminal combination having properties which are independent of the length of the line.

It is known, from German AS No. 22 54 148, to reduce the sending and receiving amplification of amplifier circuits in the subscriber's terminal, in linear proportion to the line DC current increase in excess of a predetermined minimum threshold value. Above a higher line DC current value, the two amplifications remain constant. The circuit of this references however, produces only a minimum threshold of the line DC current of about 1 mA which is too small since practical applications require 20 and 30 mA. Nothing can be learned from the reference about how to design a circuit for a higher minimum threshold current. Further, the gain variation with a linear drop over the line DC current obtained with this prior art circuitry does not correspond to the actual requirement, namely to obtain an amplification which is almost inversely proportional to the line DC current.

SUMMARY OF THE INVENTION

The present invention is directed to an improvement over the prior art. More particularly, a circuit arrangement of the above-mentioned kind is provided with control means which act almost inversely proportional to the line current. Thus permitting a variation in amplification which is actually necessary for unequal lengths of the line.

The inventive circuitry makes it possible to obtain control means with which the signal attenuations of incoming and outgoing useful signals (speech signals) can be compensated for with an accuracy of up to 0.5 dB, independently of the length of the subscriber line.

The invention includes an advantageous embodiment which is suitable for controlling an earphone amplifier and a microphone amplifier.

Another feature of the invention has the great advantage of providing, in addition but without additional expenses, control means for a controllable impedance circuit effecting a sidetone attenuation independent of the length of the subscriber line.

Accordingly an object of the present invention is to provide a circuit arrangement, in a communication terminal which is supplied with a line current from a communication line and which includes at least one of an earphone and a microphone amplifier with a control input for varying an amplification factor thereof, comprising, current to voltage conversion means connected to the communication line for converting the line current into a signal voltage which is proportional to the line current, voltage threshold means connected to the conversion means for providing the difference by which the signal voltage exceeds the threshold voltage and at least one grounded base transistor having an emitter connected to the voltage threshold means and a collector connected to the control input of the at least one amplifier, a collector DC current of the at least one transistor varying exponential with a reciprocal value of the line current.

Another object of the invention is to provide such a circuit arrangement which includes a measuring resistor connected for measuring the DC part of the line current, a differential amplifier with a built in offset as a threshold means connected with one input to the resistor, a second transistor as a output stage of the differential amplifier having a grounded emitter, a base connected to the output of the differential amplifier and a collector connected to the other input of the differential amplifier and to at least one output resistor having a tap which is connected to the emitter of at least one transistor having a diode-stabilized base voltage as usual in current mirror circuits and a collector which feeds the control current into other parts of the circuit which is reduced from its maximal value if the voltage drop at the measuring resistor exceeds the sum of the fixed built in threshold voltage of the differential amplifier and the emitter voltage of the transistor which generates the control current in such a way that the output resistor driven from the differential amplifier begins to sink current, which lovers the emitter base voltage of the said control current generating transistor.

A still further object of the invention is to provide such a circuit aarangement which is simple in design, rugged in construction and economical to manufacture, and which is adapted for manufacture in the form of an integrated circuit.

The various features of novelty which characterize the invention are pointed out with particularity in the claims annexed to and forming a part of this disclosure. For a better understanding of the invention, its operating advantages and specific objects attained by its uses, reference is made to the accompanying drawings as descriptive matter in which preferred embodiments of the invention are illustrated.

BRIEF DESCRIPTION OF THE DRAWINGS

In the following, the invention is explained in more detail with reference to an embodiment shown in the drawings in which.

DESCRIPTION OF THE PREFERRED EMBODIMENTS

Figure 1:
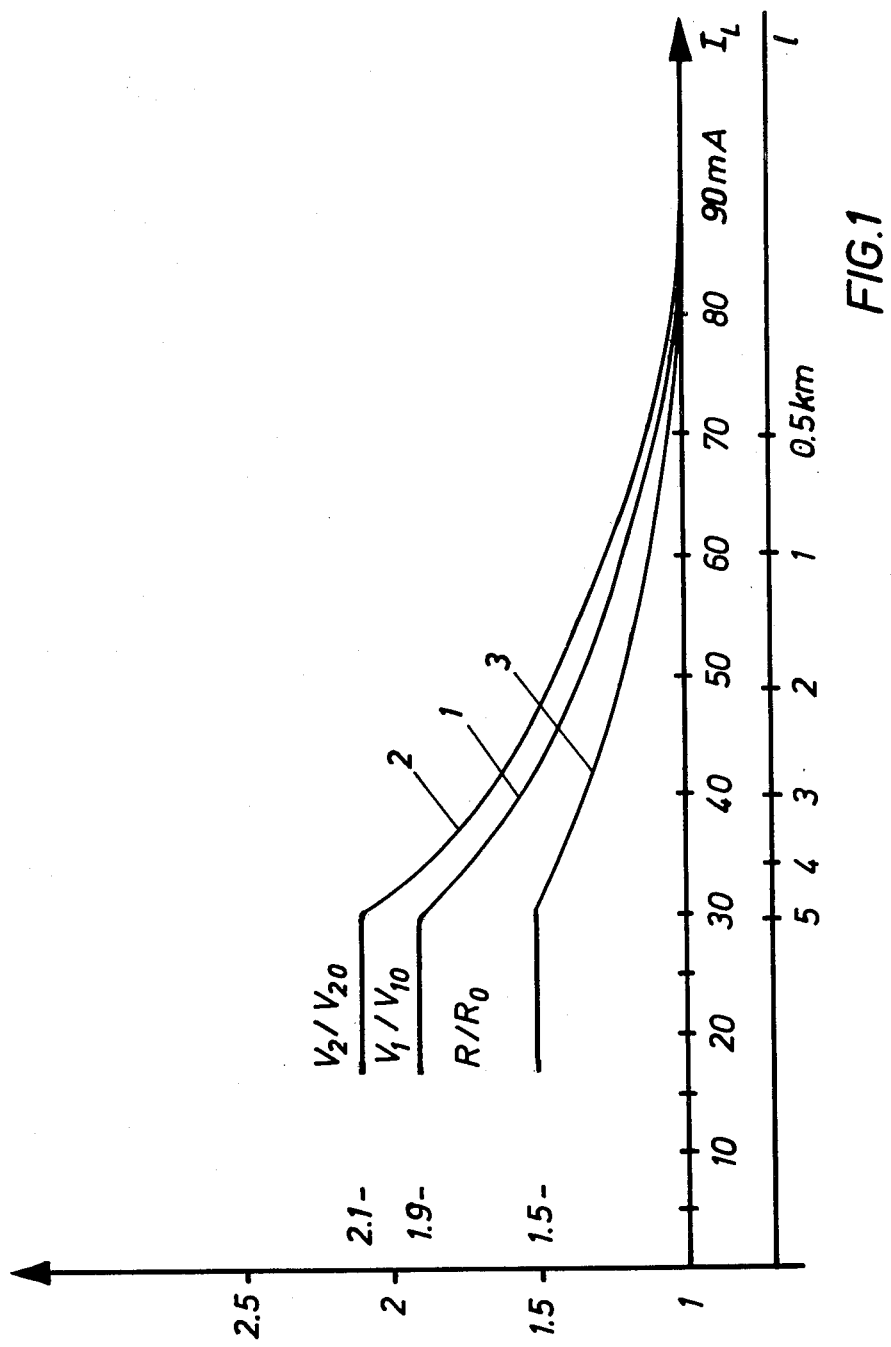
FIG. 1 is a graph which illustrates the variation of amplifications $V_1/V_{10}$ and $V_2/V_{20}$ for sending and receiving directions, and of the balancing impedance $R/R_0$, all referred to the desired value for a line length of 0 km.

FIG. 1 shows the required variation in amplification (ordinate) $V_1$ for the sending direction (curve 1) and $V_2$ for the receiving direction (curve 2), as plotted against the length 1 of the line (in kilometers) and the line current $I_L$ (in mA). These values apply for an internal impedance of the subscriber's terminal of 900 ohm, an internal impedance of an exchange 60 V-voltage source of 600 ohm, and a line impedance of 185 ohm/km for a constant signal value at the exchange side at a frequency of about 1300 Hz, thus a frequency at which the line loss and the CCITT reference equivalent attenuation are approximately equal to each other.

As follows from FIG. 1, with a subscriber's terminal which is connected to a line having a length l=5 km and, consequently, receives a line current of 30 mA. the relative sending amplification $V_1/V_{10}$ must be 1.9, i.e. the signal voltage delivered to the line at terminals of the subscriber's set must be 1.9 times the signal voltage which would be required for a constant signal voltage at the exchange side if the subscriber's set would be connected to a very short line (limit value l=0 km), and consequently, would receive a line DC current of 90 mA.

On the other hand, again with a 5 km long line, the received signal voltage is lower by the factor 2.1 than at the exchange side and must be amplified by this factor $V_2/V_{20}=2.1$ (curve 2) to receive the same signal level as with a line length of l=0 km.

Further, to prevent a sidetone signal reception, a hybrid or antisidetone circuit with a balancing network are provided in the subscriber's terminal. This hybrid circuit, however, performs its function in the desired manner only if the line impedance remains constant. Since this is not the case with unequal lines, the balancing impedance necessary also varies as a function of the line length, to obtain a satisfactory operation. Curve 3 in FIG. 1 shows the necessary variation of the real component of the relative balancing impedance $R/R_o$ as a function of the line length 1 or the line current $I_L$. Consequently, with a line length of l=5 km, the real component of the balancing impedance must be augmented by the factor 1.5 relative to its value at l−0 km, if a mismatching of more than 20% is to be prevented.

Figure 2:
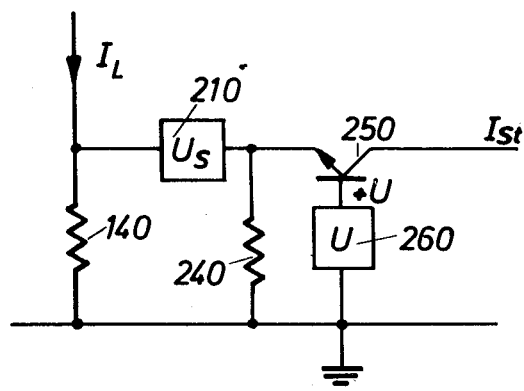
FIG. 2 is a schematic diagram which shows the basic concept of the circuit for deriving the control current $I_{St}$.

FIG. 2 shows the basic concept of an inventive circuit arrangement for producing the control current $I_{St}$ which permits the control of the amplifications $V_1$ and $V_2$ in accordance with the variation shown in FIG. 1. According to FIG. 2, the DC part of the line current $I_L$ flows through a resistor 140 and produces thereacross a voltage which is proportional to the line current. A grounded-base transistor 250, of the NPN type in this example, has a resistor 240 connected to its emitter terminal, and a voltage +U relative to the reference potential is applied to its base, due to a constant voltage source 260. A potential at the collector of transistor 250, which is higher than the reference potential, initially causes a constant collector current which, in accordance with the invention, is used as the control current $I_{St}$.

Between resistor 140 carrying the line current, and the emitter of transistor 250, a circuit element 210 is connected whose threshold voltage is fixed and by which a voltage linearly varying with the line current $I_L$ of the subscriber line is delivered to the emitter of transistor 250 only above the sum of the predetermined threshold value of the circuit element 210 and the emitter voltage of transistor 250.

Figure 3:
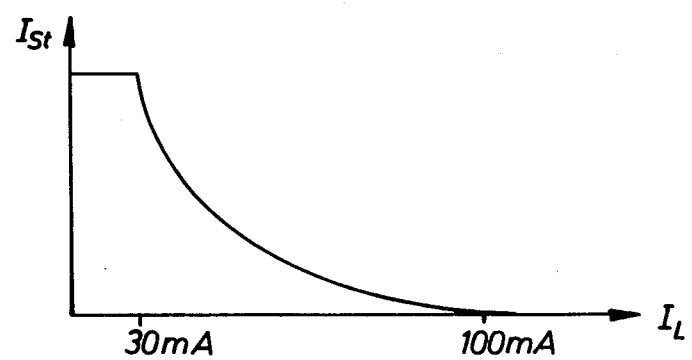
FIG. 3 is a graph which shows the control current $I_{St}$ plotted against the line current $I_L$.

FIG. 3 shows how the collector current of transistor 250 varies with the line current $I_L$. As long as the product $I_L \times R_{140}$ is smaller than the threshold voltage, the collector current, and thus control current $I_{St}$, remain constant. A further increase voltage at resistor 240 reduces the emitter-to-base junction voltage of transistor 250, so that the control current decreases exponentially with the increasing line current.

As will be explained hereinafter, with such a control current variation, the negative feedback of an amplifier may advantageously be controlled in such a way that a strong control current reduces the negative feedback and augments the amplification. The manufacturing tolerances for amplification and variations thereof may thus considerably be reduced.

Figure 4:
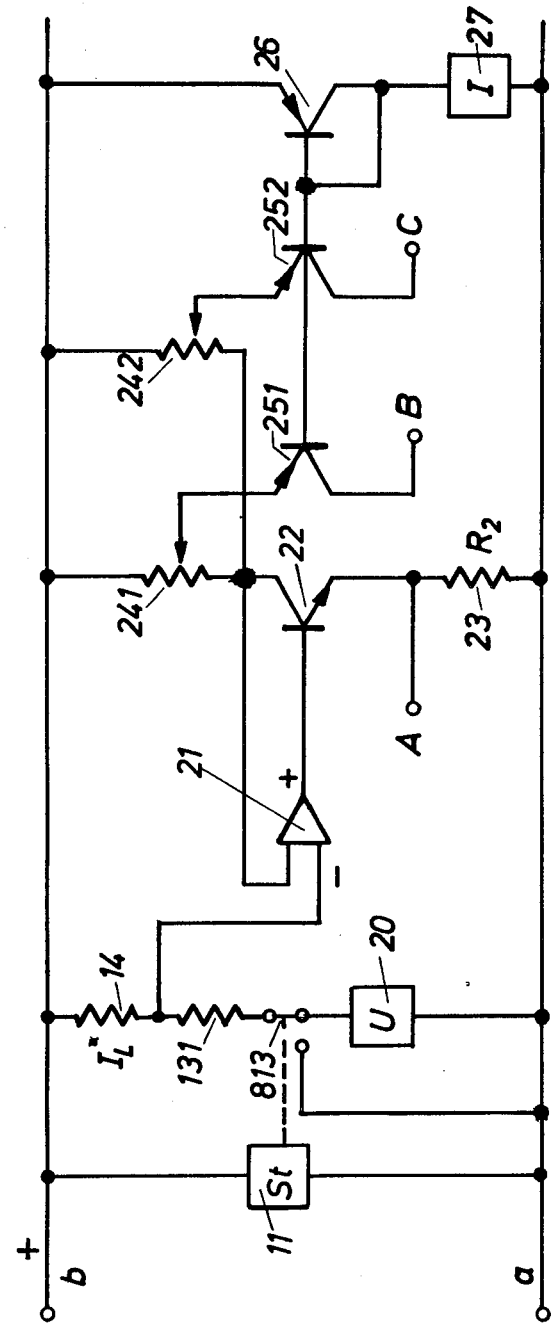
FIG. 4 is a schematic diagram which illustrates an advantageous embodiment for obtaining control means which can be tapped off at terminals A,B,C.

FIG. 4 shows an advantageous embodiment of the invention. The line current is supplied through the subscriber line to the terminals a,b of a telephone set, for example. Only the electronic elements substantial to explaining the invention are shown.

The left hand section including elements 11 and 20 is known from U.S. Pat. No. 4,316,135 and serves the purpose of producing, from the line current $I_L$, a constant supply voltage $U_{20}$ in the telephone set. For this purpose, a high proportion of the DC part of the line current flows through resistors 14 and 131 and an electronic switch 813. The control 11 operates to the effect that upon a voltage drop at terminals a and b below the voltage of constant voltage source 20 due to an AC voltage superposed on the subscriber line, the line current flowing through resistor 14 is not interrupted.

In the shown embodiment, the grounded-base transistor for delivering the control current is transistor 251, for example. The base-to-emitter voltage of a diode-connected transistor 26 with a constant current source 27 is applied as a constant voltage to the base of transistor 251. During temperature variations, the emitter current and thus the collector current of transistor 251 are held constant due to the temperature dependence of the base-to-emitter voltage.

A differential amplifier 21 and a transistor 22 in grounded emitter arrangement are connected between the junction of resistor 14 and 131 and the emitter of transistor 251. The offset voltage of differential amplifier 21, among others, is utilized as the threshold voltage, which is adjusted to about 50 mV.

The emitter of transistor 251 is connected to a tap of the load resistor 241 of transistor 22. The collector of transistor 251 serves as source of the first control current $I_{St}$ which is available at terminal B.

As further shown in FIG. 4, another load resistor 242 is connected in parallel to load resistor 241. This load resistor again is designed as a voltage divider and the emitter of another transistor 252 in grounded-emitter arrangement is connected to the tap thereof. Base voltage is furnished to transistor 252 by transistor 26, in the same way as to transistor 251. Another control current is available at the collector of resistor 252, i.e. at terminal C. In the considered example, terminal B is intended for connecting a controllable microphone amplifier (sending amplifier) and terminal C is intended for connecting a controllable earphone amplifier (receiving amplifier).

To effect controls which are independent of each other, two transistors 22 connected in parallel and having separate load resistors may be employed. It is staisfactory, however, as shown in the example, to provide a single transistor 22 for both of the transistors 251 and 252, and to connect the emitters of transistors 251 and 252 each to the tap of a respective one of two voltage dividers which are connected in parallel and operate as load resistors of transistor 22.

The second input of differential amplifier 21 is connected to the collector of transistor 22. With no current flowing into transistor 22, the maximum possible control current flows through transistors 251 and 252 by which, through voltage drops at resistors 241 and 242, an initial voltage is produced at the collector of transistor 22, which also is applied to the second input of differential amplifier 21. Only after this voltage, inclusive of the offset voltage of differential amplifier 21, is exceeded by the voltage across resistor 14, is the differential amplifier balanced out. In this way, the constant control current for line currents $I_L$ between 0 and a predetermined minimum value, such as 30 mA, is obtained, as shown in FIG. 3. Starting from this point, the potential at the collector of transistor 22 varies by the same amounts as the voltage at resistor 14. Consequently, a linear voltage variation at resistor 14 effects a linear voltage variation at the emitters of transistors 251 and 252, so that the control currents available at terminals B and C decrease exponentially in accordance with the exponential emitter-to-bsse characteristic of the transistors.

The circuit shown in FIG. 4 has the further advantage of permitting the derivation therefrom of another control means for controlling the balancing network of a subscriber's terminal. To this end, an emitter resistor 23 is connected to the emitter of transistor 22, at which the needed control means is available. This control means is a voltage which varies with the line current and can be collected at A.

Figure 5:
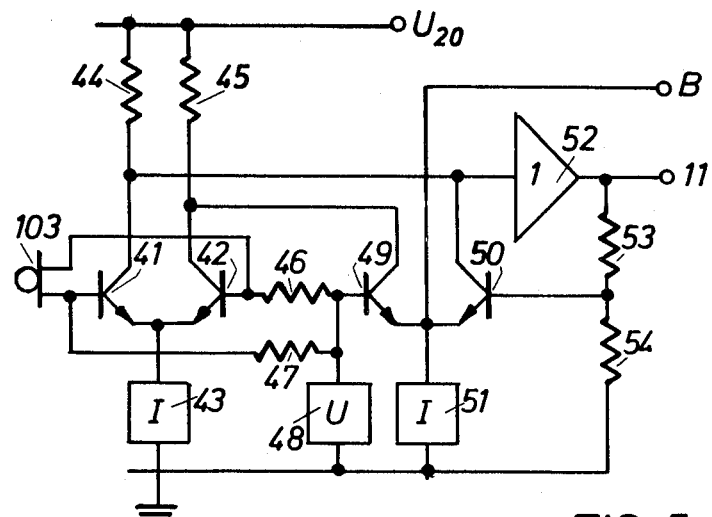
FIG. 5 is a schematic diagram which shows a controllable microphone amplifier with the control terminal at B.
Figure 6:
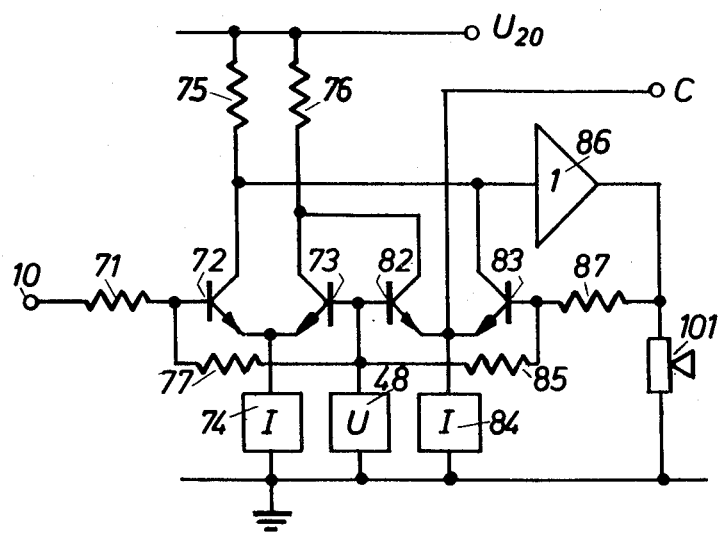
FIG. 6 is a schematic diagram which shows a controllable amplifier, with the control terminal at C.

FIGS. 5 and 6 illustrate how the control currents available at terminals B and C (FIG. 4) are used. FIG. 5 is a schematic of a controllable microphone amplifier showing a microphone 103, first and second differential amplifiers, and a terminal amplifier 52 having an output 11. The first differential amplifier comprises transistors 41 and 42 and their load resistors 44 and 45, a common emitter current course 43, and a base bias source 48 whose voltage is applied to the transistors through resistors 46 and 47. Microphone 103 is connected to the respective bases of transistors 41 and 42. As a rule, the collector of transistor 41 is used as the output of the first differential amplifier.

The second differential amplifier comprises resistors 49 and 50 and their common emitter current source 51. Their collectors are connected to the collectors of transistors 41 and 42 of the first differential amplifier, i.e. the collector of transistor 49 is connected to the collector of transistor 42, and the collector of transistor 50 is connected to that of transistor 41. The base of transistor 49 also is applied to the base voltage source 48 which is a source of constant voltage derived from the supply voltage $U_{20}$.

The input of terminal amplifier 52 having a voltage amplification factor $V_E=1$, is connected to the output of the first differential amplifier, thus the collector of transistor 41, and to the collector of transistor 50 of the second differential amplifier. From the output 11 of terminal amplifier 52, a negative feedback is provided through a voltage divider 53,54 to the base of transistor 50 of the second differential amplifier, producing its effect through the collector of transistor 50 and the input of terminal amplifier 52.

The voltage $U_{20}$ for supplying the first differential amplifier and the terminal amplifier 52 may be taken from the constant voltage source 20 shown in FIG. 4.

Further, at the emitter junction of transistor 49 and 50, a control line is provided leading to terminal B.

A control current incoming at terminal B (FIG. 5) reduces the emitter currents of transistors 49 and 50 and thus the transconductance thereof, so that with an increasing control current, the negative feedback decreases. Thereforem voltage divider 241 in FIG. 4 must so be adjusted that with a maximum possible line current (90 mA) transistor 251 is blocked and, consequently, the control current through terminal B is 0 and the negative feedback in the microphone amplifier has its maximum value.

With a minimum permissible line current (30 mA), the control current attains its maximum value and should take up about a half of the current from constant current source 51 (FIG. 5). For this purpose, constant current $I_{51}$ or the resistance of load resistor 241 may properly be chosen.

FIG. 6 is a diagram of an earphone amplifier comprising an input 10, first and second differential amplifiers, an end stage 86, and an earphone 101. The first differential amplifier comprises transistors 72 and 73, an emitter current source 74, and load resistors 75 and 76. The second differential amplifier comprises transistors 82 and 83 and an emitter current source 84.

Terminal amplifier 86 has a voltage amplification factor 1 and is provided at the output of the first differential amplifier, i.e. at the collector of transistor 72. A negative feedback is provided from the output of amplifier 86 through a resistor 87 to the input of the second differential amplifier, i.e. the base of transistor 83 whose collector is connected to the input of terminal amplifier 86.

The circuit of the earphone amplifier substantially corresponds to that of the microphone amplifier shown in FIG. 5, except for the unsymmetrical input of the first differential amplifier. The voltage $U_{20}$ for supplying the first differential amplifier and the terminal amplifier 86 may again be taken from the constant voltage source 20 shown in FIG. 4.

In this design, the control current comes to the emitter junction of the transistors of the second differential amplifier from terminal C (see FIG. 4). Operation and adjustment of the amplification control correspond to the explanation given in connection with FIG. 5.

Figure 7:
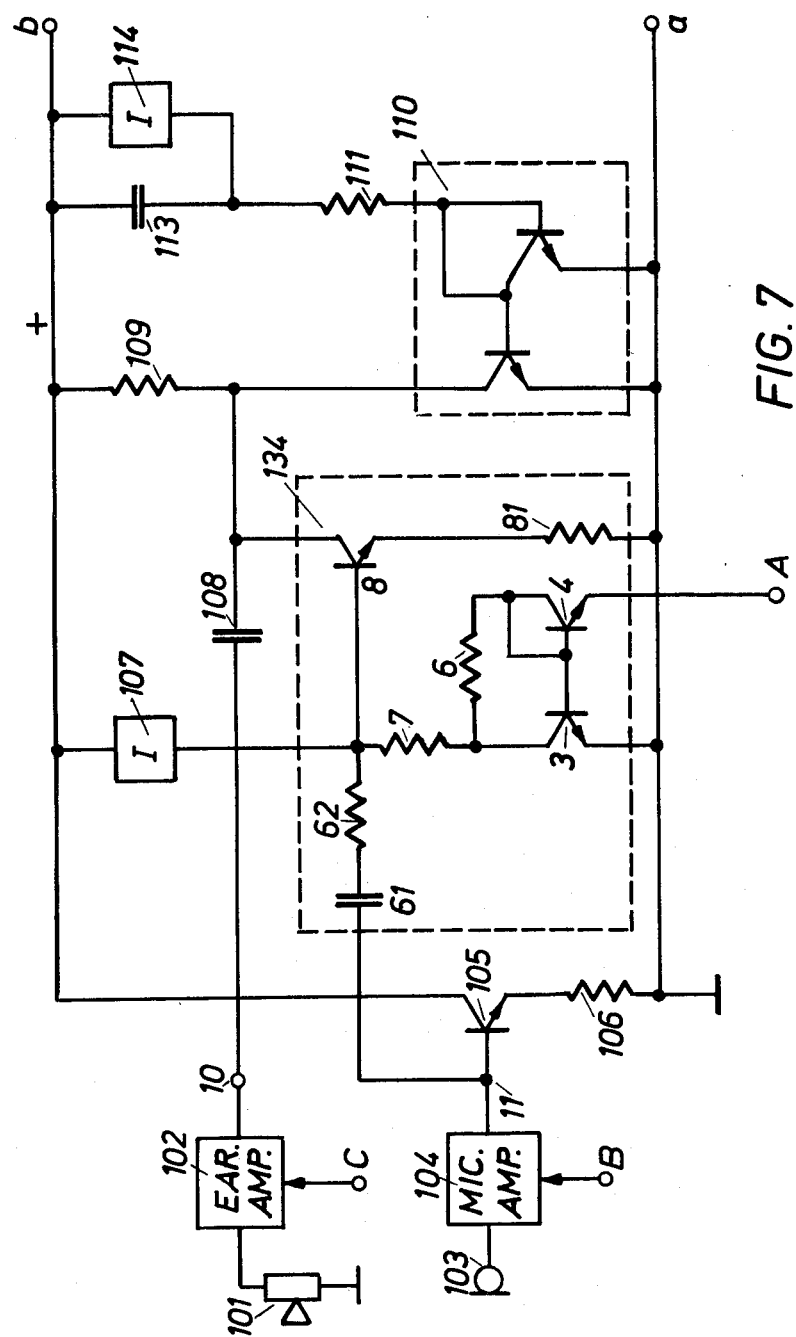
FIG. 7 is a simplified schematic circuit diagram of an electronic telephone set comprising controllable microphone and earphone amplifiers and a balancing network which is controllable through terminal A.

Finally, FIG. 7 shows a circuit for controlling the balancing network in accordance with the line current. This circuit is known from German OS No. 29 46 305. The signals from microphone 103 are amplified by microphone amplifier 104 which has been described above in detail and is shown in FIG. 5, and then directed to a transistor 105 to be fed into the subscriber line (terminals a,b). Speech signals coming from the subscriber line pass through capacitor 113, resistor 111, current mirror or clipper circuit 110, and capacitor 108, to earphone amplifier 102 and earphone 101. The earphone circuit is shown in FIG. 6 and described in connection therewith.

Since the speech signals from microphone 103 directed through microphone amplifier 104 and transistor 105 might also pass through capacitor 113, resistor 11, circuit 110 and capacitor 108, to earphone amplifier 102, they are compensated for by a balancing network 134 intended to eliminate an undesirably strong listening from the earphone. Balancing network 134 is known from German OS No. 29 46 305, and designed as a controllable impedance circuit 134 operating to add the microphone amplifier speech signals, branched off at 11, in phase opposition to those coming with an almost identical amplitude from circuit 110, at the junction between capacitor 108 and resistor 109.

The control voltage available at terminal A (FIG. 4) is applied to controllable impedance circuit 134 (balancing network) at the identically designated terminal. Within circuit 134, a current mirror connection is formed by transistors 3,4 and a resistor 6. With line currents below the minimum value (30 mA), the control voltage at terminal A is 0, above this value the control voltage is positive and increases linearly with a linearly increasing line current. Higher positive voltages at terminal A produce a stronger collector current $I_3$ through transistor 3, and a decreasing current $I_6$ through resistor 6, so that the DC current resistance $r_1$ between the collector and the emitter of transistor 3 decreases in accordance with the equation $$r_1 = R_6/(1 + I_3/I_6)$$

The design is such that with the minimum permissible line current (30 mA), at which the current through resistor 23 (FIG. 4) is 0, the impedance circuit 134 has a first desired value, and that with the maximum line current (90 mA), it has a second desired value which is associated with the length 0 of the subscriber line.

While specific embodiments of the invention have been shown and described in detail to illustrate the application of the principles of the invention, it will be understood that the invention may be embodied otherwise without departing from such principles.

What is claimed is:

1. A circuit arrangement, in a subscriber terminal which is applied with a line current from a subscriber line and which includes at least one of an earphone and a microphone amplifier with a control input for varying an amplification factor thereof, comprising:

current to voltage conversion means connected to the line for converting the line current into a signal voltage which is proportional to the line current;

voltage threshold means connected to said conversion means for providing the amount by which the signal voltage exceeds a selected threshold voltage and at least one first grounded base transistor having an emitter connected to said voltage threshold means and a collector connected to said control input of said at least one amplifier, a collector DC current of said at least one first transistor varying exponentially with a reciprocal value of the line current.

2. A circuit arrangement according to claim 1, wherein the current to voltage conversion means comprises resistor means connected to the subscriber line for receiving he line current, a junction connected to said resistor means for supplying the signal voltage, said voltage threshold means comprising a differential amplifier (21) having a first input connected to said junction and a second transistor (22) having a grounded emitter and a collector connected to said emitter of said at least one first transistor, said differential amplifier having a second input connected to said second transistor collector and an output connected to the base of said second transistor, said differential amplifier generating an offset voltage which forms said threshold voltage.

3. A circuit arrangement according to claim 2, including a voltage divider (241,242) connected between said first transistor emitter and said second transistor collector, said voltage divider forming a load resistor for said second transistor (22).

4. A circuit arrangement according to claim 3, including a second voltage divider connected in parallel to said first mentioned voltage divider wherein said at least one first grounded base transistor includes, a further first transistor having an emitter connected to said second voltage divider and a grounded base, said second voltage divider connected to said second transistor collector, the subscriber terminal including a microphone amplifier and an earphone amplifier, the collector of said at least one first transistor connected to said microphone amplifier and the collector of said further first transistor connected to said earphone amplifier.

5. A circuit arrangement according to claim 2, including an emitter resistor (23) connected to the emitter of said second transistor, said emitter resistor receiving a voltage proportional to a variation in the line current, the subscriber terminal including a balancing impedance circuit, said emitter resistor having a tap (A) connected to said balance impedance circuit for applying the voltage proportional to the line current variation to said balancing impedance circuit above the threshold voltage.

* * * * *